April 17, 1928.

G. A. LOUD 1,666,710

INTERNAL COMBUSTION ENGINE

Filed Aug. 12, 1926    4 Sheets-Sheet 1

Inventor:
George A. Loud,
by Walter E. Lombard,
Atty.

April 17, 1928.

G. A. LOUD 1,666,710

INTERNAL COMBUSTION ENGINE

Filed Aug. 12. 1926　　4 Sheets-Sheet 3

Inventor:
George A. Loud,
by Walter E. Lombard.
Atty.

April 17, 1928.

G. A. LOUD 1,666,710

INTERNAL COMBUSTION ENGINE

Filed Aug. 12, 1926   4 Sheets-Sheet 4

Inventor:
George A. Loud,
by Walter E. Lombard,
Atty.

Patented Apr. 17, 1928.

1,666,710

UNITED STATES PATENT OFFICE.

GEORGE A. LOUD, OF BROOKLINE, MASSACHUSETTS, ASSIGNOR TO LOUD SLIDE VALVE ENGINE CO., OF FITCHBURG, MASSACHUSETTS, A CORPORATION OF MASSACHUSETTS.

INTERNAL-COMBUSTION ENGINE.

Application filed August 12, 1926. Serial No. 128,897.

This invention relates to a new and useful improvement in internal combustion engines, and particularly in that class of gas engines known as two cycle engines, wherein the four operations of admission, compression, impulse, and exhaust, constituting the working cycle, are performed in one revolution instead of two.

One object of this invention is to simplify the constructions and operation of internal combustion engines thereby producing greater efficiency with a minimum use of gas mixture for operating the engine.

This and other objects are carried out by the mechanism hereinafter described and particularly pointed out in the claims.

The invention consists in certain novel features of construction and arrangement of parts which will be readily understood by reference to the description of the drawings and to the claims to be hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 5 represents a horizontal section of same on line 5, 5, on Fig. 1.

Figue 6 represents a horizontal section of same on line 6, 6, on Fig. 1.

Similar characters indicate like parts throughout the several figures of the drawings.

In the drawings, 10 is a crank casing which may be of any desired construction and is provided with bearings 11 in which is positioned the revoluble power or main crank shaft 12.

This crank shaft 12 is provided with a plurality of cranks 13 and cams 14. The cranks 13 have journaled thereon connecting rods 15 the opposite ends of each of which has a pin 16 extending therethrough, said pin being mounted in the lower end of a tubular extension 17 projecting downwardly from one of the pistons 18, $18^x$.

Each crank 13 in its rotation reciprocates one of the pistons 18, $18^x$, in its cylinder 19 or $19^x$. Each cylinder 19, $19^x$, is surrounded by a water jacket 20 adapted to contain a cooling fluid to prevent the over-heating of the cylinders during the operation of the engine. The cylinders 19, $19^x$, are superimposed upon the crank casing 10 and secured thereto.

In the upper end of each cylinder 19, $19^x$, mounted the usual spark plug 21 adapted to ignite the gas charge to operate the pistons 18, 18×.

Each cam 14 coacts with a roller 22 revoluble upon a pin 22× mounted in a bifurcated member 23 screwed into the lower end of a valve 24 adapted to reciprocate in a cylindrical valve chamber 25 disposed midway between each pair of cylinders 19, 19×.

The upper ends of the pistons 18, 18×, are provided with the usual packing rings 26 which prevent the explosion of the gas charge in the explosive chambers 27 and 28 above the pistons 18, 18×, from igniting the gas in the mixing chambers 29 and 30 below said pistons 18, 18×.

The upper wall 31 of the crank casing 10 closes the lower end of the cylinders 19, 19×, and prevents the gas mixture from leaking into the crank casing 10 from the mixing chambers 29 and 30.

The valve 24 is provided with passages 32, 32× extending lengthwise thereof and having oppositely disposed ports 33, 34, near the upper end thereof and substantially oppositely disposed ports 35, 36, near the lower end thereof.

Below the ports 33, 34, said valve is provided with a peripheral annular depression 37 and near the upper end of said valve and above said ports 33, 34, is a similar peripheral annular depression 37×.

Between said depressions 37 and 37× and the ports 33, 34, the valve 24 is provided with a plurality of packing rings 38 and similar parking rings 38× surround said valve above and below the ports 35, 36 while another packing ring 38ª surrounds the upper end of said valve. Each cylinder 19, 19×, has a plurality of ports 39 at its extreme lower end communicating with the valve chamber 25.

At the top of the mixing chambers 29 and 30, the cylinders 19, 19× are provided with a plurality of ports 40 communicating with said valve chamber 25.

Immediately above the mixing chambers 29 and 30 each cylinder 19 or 19× is provided with a plurality of exhaust ports 41.

Figure 1:
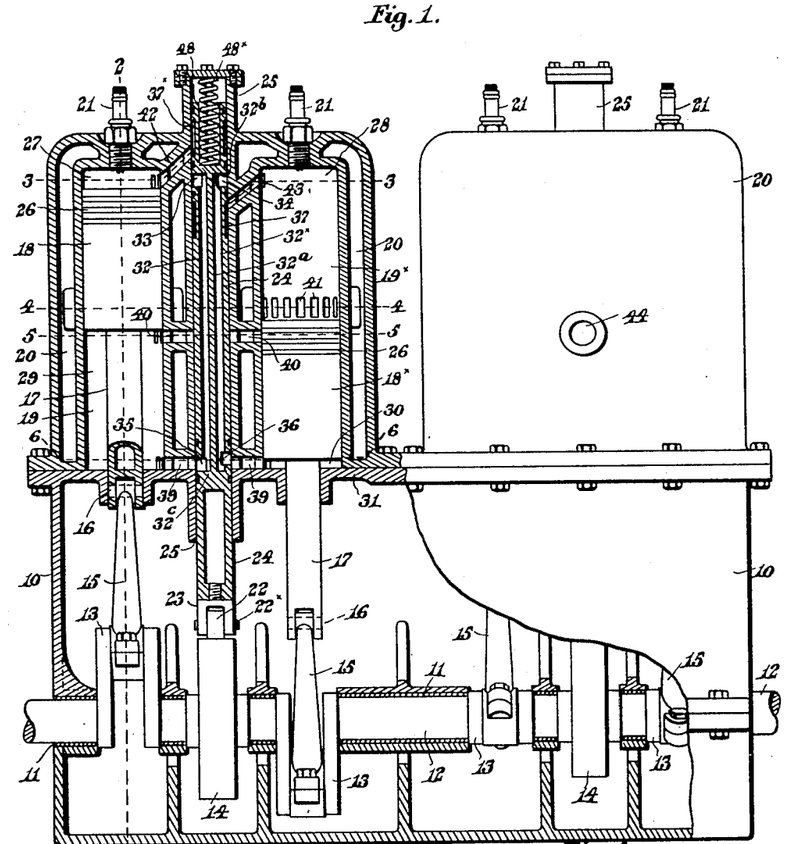
Figure 1 represents an elevation of an engine embodying the principles of the present invention a portion of the same being broken in section.
Figure 2:
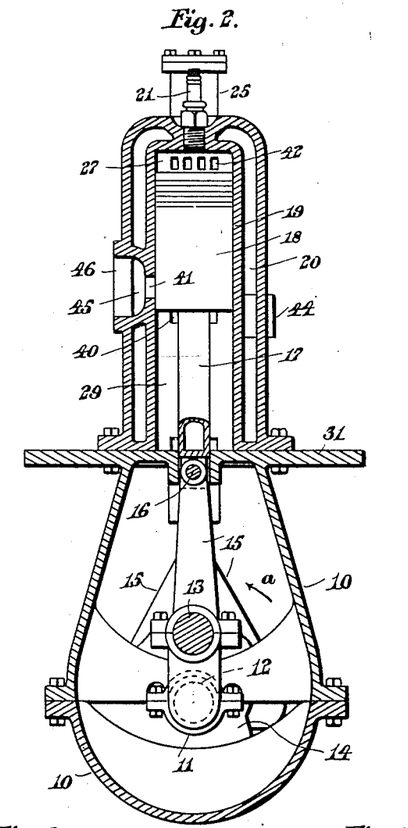
Figure 2 represents a transverse vertical section of the same on line 2, 2, on Fig. 1.
Figure 3:
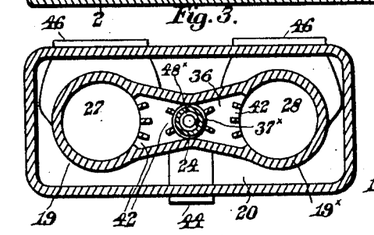
Figure 3 represents a horizontal section of same on line 3, 3, on Fig. 1.
Figure 4:
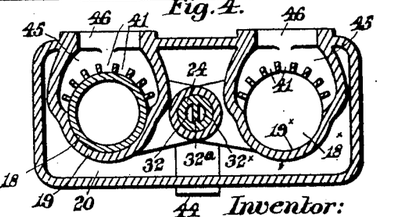
Figure 4 represents a horizontal section of same on line 4, 4, on Fig. 1.
Figures 5, 6:
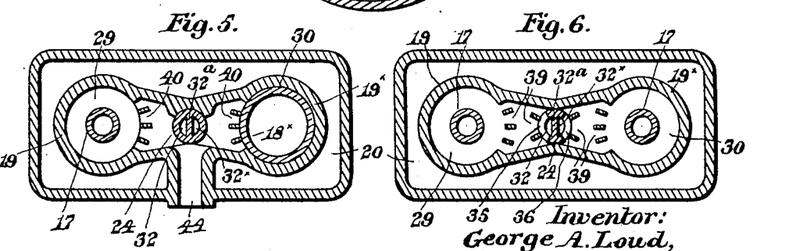

The explosion chamber 27 has extending therefrom a plurality of ports 42 inclined upwardly and communicating at the opposite ends with the valve chamber 25, while the explosion chamber 28 is provided with similar ports 43 inclined downwardly and communicating at the opposite ends with said valve chamber 25 all as indicated in Fig. 1 of the drawings.

Each valve chamber 25 has an inlet passage 44 communicating therewith through which a suitable combustile mixture may be admitted to the valve chamber 25 and through the ports 40 into the mixing chambers 29 and 30.

When an explosive mixture is admitted through the inlet passage 44 to the valve chamber 25 and through the ports 40 to the mixing chambers 29 and 30, the combustible mixture in each chamber will be compressed on the next downward stroke of the piston 18 or 18× reciprocating in said mixing chamber.

On the downward stroke of the valve 24, the ports 35 in the valve 24 will register with the ports 39 in the mixing chamber 29, and the compressed combustible mixture will enter one passage 32 in the interior of the valve 24 and as said valve moves upwardly said mixture will pass upwardly through the ports 33 in said valve and ports 42 of the cylinder 19 into the explosion chamber 27.

The interior of the valve 24 is divided into two vertical compartments or passages, 32 and 32×, by means of the partition 32ª, the ends of said compartments or passages being closed by the walls 32ᵇ and 32ᶜ at the top and bottom thereof.

Figures 7, 8, 9, 10:
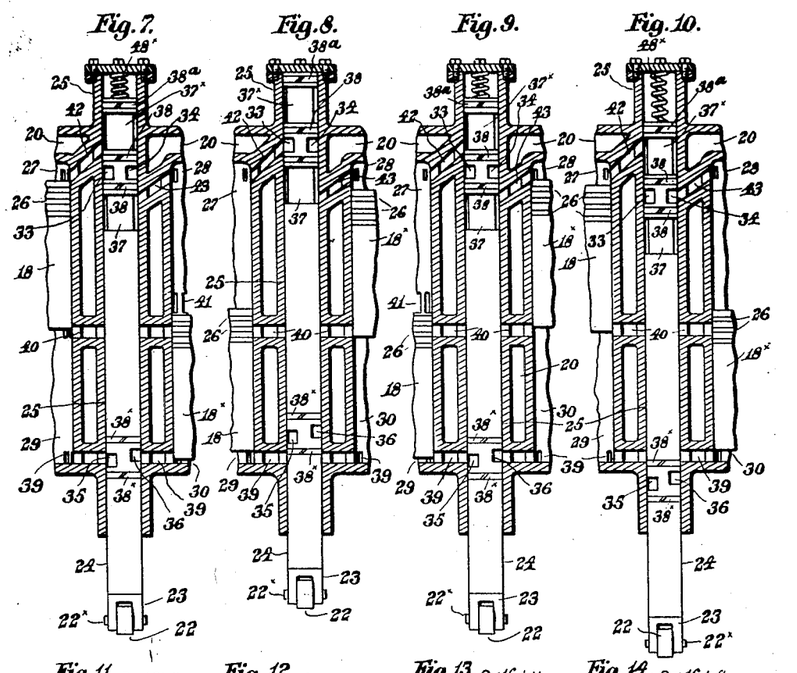
Figure 7 represents a vertical section of a portion of the same showing the positions of pistons and valve when the latter is approaching the limit of its upward movement.
Figure 8 represents a similar section showing the position of the pistons when the valve is in its highest position.
Figure 9 represents a similar section showing the position of the pistons when the valve is approaching the limit of its downward movement.
Figure 10 represents a similar section showing the positions of the pistons when the valve is in its lowest position.

It is obvious that when the ports 35 and 39 are in register the ports 33 and 42 will be out of register as shown in Fig. 7 of the drawings.

The compressed combustible mixture in the compression chamber 30 will in like manner be forced through the ports 39 and ports 36 into the compartment or passage 32× within the valve 24 and upon the upward stroke of the valve 24 pass upwardly through the ports 34 and 43 into the explosion chamber 28.

When the combustible mixture is exploded in either chamber 27 or 28, it will force the piston 18 or 18× downwardly uncovering the exhaust ports 41 when said piston 18 or 18× reaches it lowest position.

The burnt gases will then escape through the ports 41 into the chamber 45 and through the discharge opening 46.

The annular depression 37 is of sufficient length to be in communication with the ports 42 when the ports 33 and 34 of the valve 24 are in a position midway of the ports 42, 43.

It is obvious from an inspection of the drawing that the inlet ports 40 are never uncovered by said pistons except when in their uppermost position.

At all other times the pistons 18, 18×, will close the inlet ports 40 and prevent the admission of a combustible mixture to the mixing chambers 29 and 30. When explosion takes place in either of the explosion chambers 27 or 28, the annular peripheral depressions 37, 37×, will be opposite the ports 42, 43 respectively and any gases exploding in said ports or said depressions 37, 37×, will be neutralized against the end walls of said depressions and therefore have no effect upon said valves.

By providing the depressions 37, 37×, the valve 24 is perfectly balanced and no injurious affect can be produced upon said valve or the walls of the valve chamber 25 by the explosion of the combustible mixture.

The throw of the cam 14 is less than half the length of the crank 13 and consequently the valve 24 will move less than half the distance that the pistons 18, 18ˣ, move in their reciprocation.

It is self-evident that the combustible mixture will be admitted to the combustion chamber 27 when the valve 24 is moving in one direction and the combustible mixture will be admitted to the combustible chamber 28 when said valve is moving in the opposite direction.

The main crank shaft 12 revolves in the direction of the arrow $a$ on Figs. 2 and 11 to 14 inclusive, when the car on which the engine is mounted is moving forward. When it is desired to back the car this can be accomplished by simply revolving the shaft 12 in the opposite direction. This can be done by stopping the engine and then cranking said engine in the reverse direction or effecting the same reverse movement by means of a self-starter.

When the valve 24 is in the position indicated in Fig. 7 of the drawings, the explosive mixture in the explosion chamber 27 is about to fire and move the piston 18 therein downwardly. At this time the cranks 13, cam 14, and connecting rods 15 will be in the position indicated diagrammatically in Fig. 11.

When the valve is in the position indicated in Fig. 7 a new supply of combustible mixture will be admitted into the mixing chamber 29 and into the compartment or passage 32 from said mixing chamber 29.

When the valve 24 is in its uppermost position as indicated in Fig. 8, the compressed mixture for the mixing chamber 29 and compartment 32 of the valve 24 will be permitted to pass into the explosion chamber 27 and it is obvious than on the upward stroke of the piston 18 a further compression will be given to the combustible mixture in said explosion chamber. The upward stroke of each piston will create a vacuum in its mixing chamber and thereby cause a fresh supply of combustible mixture to be drawn into said chamber as soon as the piston 18 uncovers the ports 40.

It is self-evident that the combustible mixture is first compressed in the mixing chamber on the downward stroke of the piston 18 and is further compressed in the explosion chamber on the upward stroke of the piston 18. When admitted to the explosion chamber it has a pressure of about fifty pounds.

Figures 11, 12, 13:
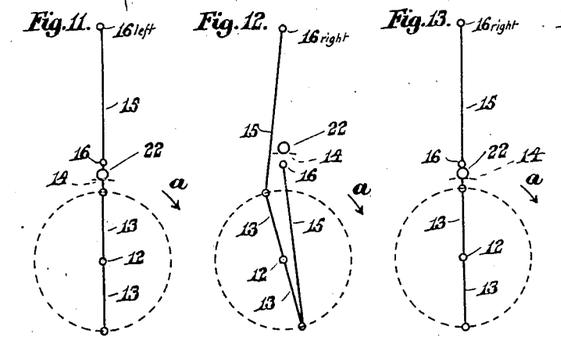
Figures 11 to 14 inclusive represent respectively diagrammatic views indicating the positions of the various cams when the pistons and valve are in the positions shown in Figures 7 to 10 inclusive.

When the valve 24 and pistons 18, 18ˣ, are in the position indicated in Fig. 8, the cranks 13, cam 14, and connecting rods 15 will be in the position indicated diagrammatically in Fig. 12 of the drawings.

When the valve is in the position indicated in Fig. 9, a fresh supply of the combustible mixture will be admitted into the mixing chamber 30 and the combustible mixture in the explosion chamber 28 will be ready to explode. When the valve 24 and pistons 18 are in the positions indicated in Fig. 9 of the drawings, the cranks 13, cam 14, and connecting rods 15 will be in the positions indicated diagrammatically in Fig. 13 of the drawings.

Figure 14:
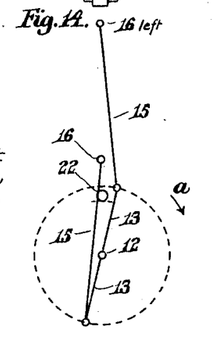

When the valve is in the position indicated in Fig. 10 of the drawings, the combustible mixture will be permitted to pass from the compartment 32ˣ of valve 24 into the explosion chamber 28 and the cranks 13, cam 14 and connecting rods 15 will at this time be in the positions indicated diagrammatically in Fig. 14 of the drawings.

When the valve 24 is in the position indicated in Fig. 10 of the drawings, the piston 18 in the explosion chamber 27 will be ready to move downwardly and create a suction in said explosion chamber which will cause the combustible mixture within the compartment 32 to be drawn through the ports 33 and 42 into the explosion chamber as soon as these ports 33, 42, communicate in the reciprocation of the valve 24.

In the operations of both pistons 18, 18ˣ, they are so timed that in their return stroke they close the exhaust ports 41 before the fresh compressed charges of gas can escape through said exhaust ports 41.

The valve 24 is provided with suitable packing rings 38, 38ˣ, and 38ᵃ to prevent any escape of gas or any chance of back fire around the valve 24 as the mixed gas charges pass into the explosion chambers 27 or 28 which is accomplished for the explosion chamber 27 by the upper packing rings and for the explosion chamber 28 by the lower packing rings and the escape of gas from the interior of the valve 24 into the crank casing 10 is prevented by the closed end 32ᶜ of the valve 24 while the opposite end of this valve 24 is closed by the wall 32ᵇ.

From the above it will appear that the mixing chambers 29 and 30 of the cylinders 19 respectively alternately receive an explosive gas mixture and partly compresses and mixes the same and forces it alternately into the top of the explosion chambers 27 and 28 respectively, where the gas charges are compressed and alternately explode and operate the pistons 18, 18ˣ, alternately to drive the power or main crank shaft 12. The valve 24 is moved upwardly by the cam 14 on the power shaft 12 and is so timed as to take in its reciprocation the positions relatively to the pistons 18 as indicated in Figs. 7 to 10 inclusive.

The upper end of the valve 24 has a depression or pocket 48 therein in which is disposed a spring 48˟ which retains the roller 22 in contact with the cam 14 under all conditions.

Figure 15:
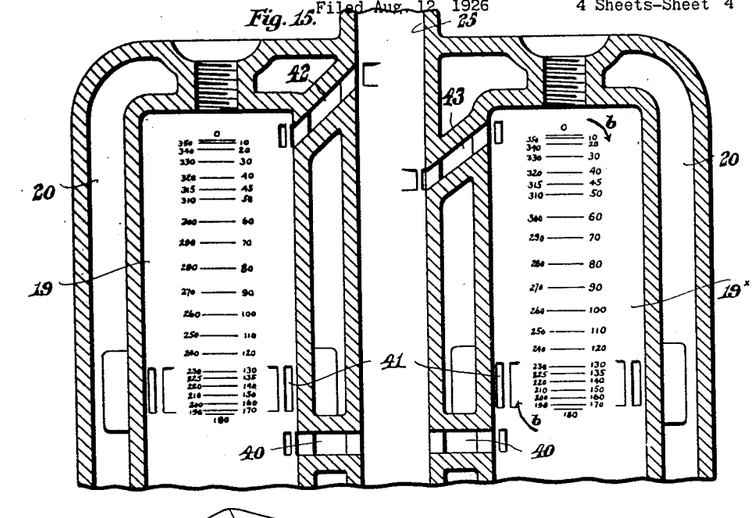
Figure 15 represents a vertical section of the upper part of one pair of cylinders with pistons removed.
Figure 16:
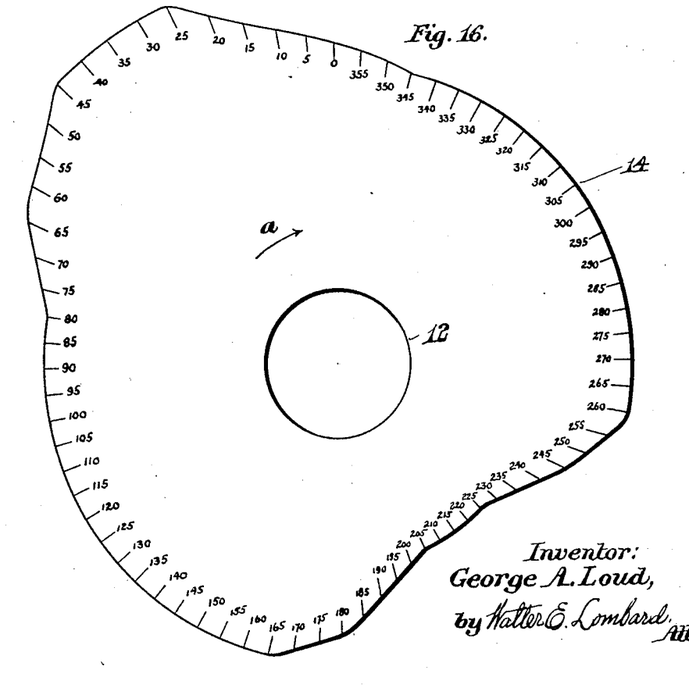
Figure 16 represents an elevation of the cam for actuating the valve member.

The figures on the right of Fig. 15 correspond to the figures on the cam 14 in Fig. 16 and following these figures in the directions of the arrows $b$ on Fig. 15 it is evident that they represent the exact positions of the top of the piston 18˟ during each revolution of the cam 14.

In other words, if the roller 22 is in contact with any particular point on the cam 14, say at 100, the top of piston 18˟ will be at the line marked 100 on the right or Fig. 15 and the top of the piston 18 will be at a point 180 degrees therefrom, as 280 on the left side of said Fig. 15.

It is obvious, therefore, that by means of these figures 15 and 16 and the markings thereon the relative positions of the pistons 18, 18˟, and the roller 22 contacting with the cam 14 may be determined readily throughout all the movements of these elements.

By referring to Fig. 16 it will be noted that while the movement of the pistons 18, 18˟, is continuous, the valve 24 will be stationary while the roller 22 is contacting with the cam 14 between 80 and 165 and also between 260 and 345, the ports 33, 34 in the valve 24 at these times being substantially midway of the ports 42, 43, while the ports 35, 36 are in register with the ports 39 and the combustible mixture is being admitted to the passages or compartments 32 and 32˟.

While the roller 22 is in contact with the portion of cam 14 from 345 to 25, the valve will be lifted to its highest point and in this position remain stationary from 25 to 45, during which time the combustible mixture in the passage 32 will be discharged into the explosion chamber 27 of the cylinder 19.

While the roller 22 is in contact with the portion 45—80 of the cam 14 the valve 24 will move downwardly to its intermediate positions and remain at a standstill until the roller 22 reaches the point 165 when the valve 24 will again move downwardly until it reaches the point 205.

By means of this construction an opportunity is afforded for any gas entering either compartment 32 or 32˟ to be subjected to the heat of the engine while contained within said compartments before being discharged through the ports 33, 34 into the explosion chambers 27, 28.

It will be noted that the port 33 is closed when the mixture is being admitted to the compartment 32, as shown in Fig. 7 and the valve 24 must move upwardly into the position shown in Fig. 8 before the mixture may be discharged from the compartment 32 into the explosion chamber 27.

Likewise when the mixture is being forced into the compartment 32˟ with the port 36 open as shown in Fig. 9, the port 34 is closed and the valve 24 must move downwardly into the position shown in Fig. 10 before the mixture in said compartment 32˟ may be discharged into the explosion chamber 28.

On Fig. 15 is represented a series of marks 0 to 360 to indicate the various positions of the pistons 18, 18˟ in the two cylinders 19, 19˟, during the operation of the engine and on Fig. 16 is represented a series of marks to indicate the position of the roller 22 on the cam 14 during said operation.

In the position indicated in Fig. 7 of the drawings the piston 18 in cylinder 19 it at 0 and the piston 18˟ in the cylinder 19˟ is at 180.

At this time the roller 22 contacts with the cam 14 at 180.

In the position indicated in Fig. 8 the valve roller 22 contacts with the cam 14 at 45 and top of piston 18˟ is at 45 and the top of piston 18 is at 215.

As shown in Fig. 9 the valve roller 22 contacts with the cam 14 at 0 with piston 18 at 180 and piston 18˟ at 0.

In Fig. 10 the roller 22 of valve 24 contacts with cam 14 at 210 with piston 18˟ at 210 and piston 18 at 30.

At this point it will remain stationary until the roller 22 reaches the point 225 and during this period the mixture in compartment 32˟ will be discharged through ports 34, 43 into the explosion chamber 28 of cylinder 19˟.

As the roller 22 moves over the section 225—260, the valve 24 will be lifted again into its intermediate position and remain stationary while receiving a new supply of combustible mixture after which the valve 24 will again be lifted as its roller 22 passes over the sections 345—25.

This provision of means whereby the valve 24 may remain at rest for a substantial time when the ports 33, 34 are closed and the ports 35, 36 open and whereby a short rest may be obtained while the explosion chambers are receiving their supply of combustible mixture, is an important feature of the present invention.

When the roller 22 is at 15 on the cam 14 the cylinder 19 will begin to receive the combustible mixture, the piston 18 being at this time at 195.

The port 33 will be fully open at 25 and remains fully open until 45 and is fully closer at 70.

When the roller 22 of the valve 24 reaches 80 the depression 37 will be opposite the port 33 and the cylinder 19 will be in condition to fire as soon as the piston 18 has reached its highest position.

In the downward movement of the valve 24, the combustible mixture in compartment 32˟ will commence to pass through ports 34, 43 into the explosion chamber 28 of cylinder 19× when the roller 22 is at 190 and these ports are fully open when the roller is at 210 and remain fully open until 225 when they will commence to close, being fully closed when roller 22 reaches 245.

At the point 260 the depression 37× will be opposite port 43 and the cylinder 19× will be in condition to fire as soon as the piston 18× has reached its highest point.

Less gas is required to obtain the desired power with this engine than with other engines, and it is more positive because the combustible mixture is drawn into the mixing chambers by the suction of the moving pistons on their inward strokes, and is twice expanded and compressed before exploding, thus entirely vaporizing and mixing the gas.

By this means, any chance of raw gas entering the explosion chambers is entirely overcome, and back firing and the depositing of carbon is prevented.

The raw gas preferably enters the carburetter of any desired construction where it is mixed with air in the usual manner, and is then drawn into the valve chamber 25 by the suction created by the pistons 18 on their return stroke into the mixing chambers 29 and 30 until one set of the several ports 40 is closed. With an engine constructed as herein described, the carburetter may be entirely dispensed with and the combustible mixture admitted directly through the inlet 44.

The gas is then mixed by the power strokes of one of the pistons 18 and the gas mixture is forced by said pistons respectively into the explosion chamber 27 and 28 as the case may be through the passages 32, 32× in the valve 24. During the movements of the pistons 18, 18×, the gas mixture is partly mixed in one or the other of the mixing chambers 29 and 30 and then passes through the valve 24 to the ports 33, 42 or 34, 43 as the case may be, to the explosion chambers 27 or 28 where it again expands previous to being compressed by return stroke of the pistons 18, 18×, previous to the explosions.

The gas mixture entering one of the explosion chambers 27 or 28 under this pressure forces out the dead gases through the exhaust ports 41, and being directed against the spark plugs 21 cleans the same before each explosion and eliminates the trouble of foul spark plugs.

It will be noted that the valve 24 is provided with peripheral annular depressions 37, 37×, which receive portions of the explosive charge so that when explosion takes place in the explosion chambers 27 and 28 there is at the same time an explosion in the depressions 37, 37×, which balances or takes any jar off the valve 24 and the walls of the valve chamber 25. This prevents any back fire or communication between the two explosion chambers 27 and 28.

The oil being mixed with the gas in the usual supply tank eliminates the necessity of any oil cups and insures all working parts (except those contained in the crank casing) being properly oiled. The working parts in the crank casing are oiled in the usual manner by the splash of the oil in the bottom of the casing.

The engine has no working parts exposed to dust and dirt, no valves to seat or to be reground, the one slide valve 24 controlling all six sets of ports in the valve casing 25 and is operated in one direction by a cam 14 and in the opposite direction by a spring 48 entirely enclosed within the valve casing 25.

The cylinders work in pairs with the gas charge mixed in the mixing chambers 29 and 30 of one cylinder and forced and exploded in the explosion chamber of the same cylinder with one slide valve controlling the admission of the explosive gas mixture alternately into the mixing chambers of the cylinders and controlling the flow alternately from the said mixing chambers to the explosion chambers of said cylinders, thereby giving a power stroke alternately to the pistons 18 in the companion cylinders so that when one piston is moving downwardly on its power stroke, the other piston is moving upwardly on its return stroke.

The general construction is such that the weight per H. P. is much less than usual and this engine differs from other two cycle engines in that there is no crank case compression, no valves to seat, no screws to adjust, and there are no gear wheels.

It will be seen from the foregoing that in the present invention two independent cylinders are controlled by one gas controlling valve common to both, said cylinders being adapted to alternately receive, mix, compress and explode a charge of explosive gas mixture each independently of the other, but cooperating to drive the power or main crank shaft 12.

Any number of these cylinders may be arranged in pairs and connected to the power shaft for driving the same. If desired, each cylinder could be provided with an independent gas controlling valve, but the arrangement of the two cylinders controlled by one gas controlling valve is simpler in construction and less expensive and more easily controlled.

In this explosive engine the explosive gas charge flows from the carburetter, where it is first mixed, to the gas supply chamber 36 around the valve 24 and is drawn into the lower chamber 29 or 30 by the vacuum alternately created in said chambers 29 or 30 by the return stroke of the piston 18 respectively and expands therein and on the power or out stroke of the piston 18 or 18ˣ as the case may be, the gas charge is partly compressed and mixed in said mixing chambers 29 or 30 respectively and then forced through the lower ports 39 and ports 35 or 36 into the passages or compartments 32, 32ˣ, of the valve 24 where it again expands and thence through the ports 33 and 42, or 34 and 43 into the top of the explosion chamber 27 or 28, where it is compressed by the piston 18 or 18ˣ on its return stroke as the case may be. The more the gas is chewed up, expanded and compressed, the more perfect the explosions and less consumption of gas for running the engine and with greater efficiency in operation, as it is a well established fact that the more the gas can be mixed, chewed up and compressed previous to explosions, the greater the force of the explosions, less gas consumed and general increased efficiency. By means of the mixing chambers 29 and 30 a fresh gas charge is alternately delivered into the explosion chambers under pressure due to the power stroke of the pistons 18 thus not only insuring a fresh charge of gas in the explosion chambers 27 or 28, but assisting in driving out the old gases that may remain from the last explosion.

The pistons have a full stroke for each of the operations and thus more efficiently accomplish desirable results from the operation of the engine. So far as I am aware, this is the only internal combustion engine where the explosive gas mixture is partly compressed and mixed more than once, and again where the power stroke of the pistons due to the explosions of the compressed gas charge in the explosion chambers is utilized to partly compress and mix the gas charges in the mixing chambers and further to force said mixed charges of gas into the explosion chamber where the mixed gas charge again expands and is compressed on the return stroke of the piston previous to explosion.

In most two cycle engines known to me, there is crank case compression, a gas deflector on the piston head and the new gas charge enters and the exhaust gases pass out practically at the same point with the exhaust in nearly all the cases but a small portion of the area of the piston head so that it is impossible to get a clean exhaust, and further, the piston head never goes to the top of the cylinder, but always leaves a small percentage of waste gases in the cylinder head under atmospheric pressure.

In an engine constructed as herein shown and described, there is no crank case compression, no gas deflector and the new gas comes in at the top of the cylinder and exhausts at the bottom with the exhaust port a little larger than the area of the piston head thereby insuring a free exhaust and the new gas entering in under pressure makes positive the cleaning out of the cylinder of waste gases and insures a clean mixture for every explosion.

With two cylinders as shown in the drawings, this engine is able to accomplish the same work as a four cylinder engine of the four cycle type for on each out or power stroke of each piston there is an explosion which drives the power shaft and partly compresses and mixes the new gas charge to refill the explosion chamber with a perfect exhaust of the old or waste gases, and on the return stroke of each piston the new gas charge is compressed for explosion in the explosion chamber and at the same time a fresh charge of gas is drawn into the mixing chamber for partly compressing and mixing by the next out or power stroke of the piston for the next explosion in the explosion chamber.

It will be noted that while a single valve member 24 is utilized for two cylinders, the mixture for each cylinder is kept separated from that of the other cylinder by dividing the interior chamber of said valve into two compartments 32 and 32ˣ by means of the partition 32ª extending lengthwise of the valve between the end partitions 32ᵇ and 32ᶜ.

This makes it impossible for any mixture intended for one cylinder to escape by any other means into the other cylinder.

It is believed that the operation and many advantages of the invention will be understood without further description.

Having thus described my invention, I claim:

1. In an internal combustion engine having two cylinders, a reciprocating valve having two compartments extending lengthwise thereof and separated by a central partition, one compartment during the reciprocation of said valve communicating through ports at the opposite ends of said compartment with the mixing and explosion chambers of one cylinder and the other compartment through similar ports with said chambers of the other cylinder.

2. In an internal combustion engine having two cylinders, a reciprocating valve having two separated compartments extending lengthwise thereof and separated by a central partition, each compartment having ports at the upper and lower ends thereof, the lower port of each comparment during the reciprocating of said valve communicating with the mixing chamber of a different cylinder and subsequently in said reciprocation closing said port and the upper port communicating with the explosion chamber of the same cylinder.

3. In an internal combustion engine having two cylinders with pistons therein operatively connected to a power shaft, a single valve for both cylinders divided by a central partition into two parallel compartments and adapted in its reciprocation to permit the passage through said compartments of the combustible mixture from the mixing chambers to the explosion chambers of said cylinders each compartment coacting with a different cylinder; and cam mechanism on said power shaft for moving said valve.

4. In an internal combustion engine having two cylinders, a reciprocating valve having two separated compartments therein each having laterally extending ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder; and annular open peripheral depressions on said valve one above and another below the upper ports of said valve.

5. In an internal combustion engine having two cylinders, a reciprocating valve having two separated compartments therein each having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder; annular peripheral depressions on said valve one above and another below the upper ports of said valve; and packing rings surrounding said valve between said ports and depressions.

6. In an internal combustion engine having two closed cylinders with pistons therein operatively connected to a power shaft, a single valve for both cylinders adapted in its reciprocation to permit the passage therethrough of the combustible mixture from the mixing chamber of one cylinder to the explosion chamber of the same cylinder and then permit the passage of the combustible mixture from the mixing chamber of the other cylinder to its explosion chamber; and means for reciprocating said valve and causing it to remain stationary during a portion of the downward movement of said pistons.

7. In an internal combustion engine having two closed cylinders with pistons therein operatively connected to a power shaft, a single valve for both cylinders having therein two parallel compartments separated by a central partition and adapted in its reciprocation to permit the passage through said compartment of the combustible mixture from the mixing chambers to the explosion chambers; and means for reciprocating said valve and causing it to remain stationary while the combustible mixture is being discharged therefrom into the explosion chambers of said cylinders.

8. In an internal combustion engine, two closed cylinders; a piston reciprocating in and dividing each cylinder into a mixing and an explosion chamber; a crank shaft operated by said piston; a valve chamber; a valve in said chamber cooperating with the gas feed and formed with an exterior annular recess as a part of the explosion chamber thereby to balance said valve at time of explosion, said valve having a central partition extending lengthwise thereof forming two separated compartments therein, each of which is adapted to communicate with the mixing and explosion chamber of a cylinder; and means for igniting the gas charge in said explosion chamber.

9. In an internal combustion engine, a power shaft; a pair of co-operating cylinders; valvular pistons therefor which divide the cylinders to create in each a mixing chamber and an explosion chamber, said pistons being adapted to open the feed ports for inflow of gas to the mixing chambers upon completion of the up or compression stroke and to release the exhaust gases from the explosion chambers on the down or mixing stroke; a gas supply common to said cylinders; a valve between said cylinders having two parallel compartments equipped with a plurality of ports interconnecting the said mixing and explosion chambers of the same cylinder; cooperating mechanism to actuate the valve and move said parts in unison to alternately permit the gas in the mixing chamber of one cylinder under pressure to pass through one compartment of the valve for vaporization and enter the explosion chamber of the same cylinder; and means for igniting the gas charge in the explosion chamber.

10. In an internal combustion engine, a cylinder having a mixing chamber and an explosion chamber and provided with laterally extending ports for the gas charge at opposite ends communicating with the valve chamber and inlet and exhaust ports intermediate said end ports; a valvular piston to control the inlet ports to the mixing chamber; a power shaft operable by said piston; a reciprocating valve having separated parallel compartments with ports adapted in the reciprocation of said valve to register with said ports at the opposite ends of said cylinder whereby the gas charge in said mixing chamber may be conducted through said valve to the explosion chamber; and means for igniting the gas charge in said explosion chamber.

11. In an internal combustion engine, a pair of cylinders; a valve chamber intermediate said cylinders and having three sets of ports communicating with each of said cylinders; a piston in each cylinder; a power shaft operable by said pistons; and a valve in said valve chamber driven by said shaft having separated parallel compartments therein with ports at opposite ends thereof through which the combustible mixture is adapted to pass from the lower ports to the upper ports.

12. In an internal combustion engine, a pair of cylinders; a valve chamber intermediate said cylinders and having three sets of ports communicating with each of said cylinders; a piston in each cylinder; a power shaft operable by said pistons; and a spring pressed valve in said valve chamber driven by a cam on said shaft, said valve having two parallel compartments with ports at the opposite ends of said compartments and adapted to control the flow of combustible mixture through the upper and lower ports of one cylinder in its movement in one direction and those of the other cylinder in its movement in the other direction.

13. In an internal combustion engine, a pair of cylinders; a valve chamber intermediate said cylinders and having communication with each cylinder, a set of ports near the top and bottom thereof and an intermediate set adapted to admit a fresh supply of combustible mixture; a piston in each cylinder adapted to close the intermediate ports when in the lower part of said cylinders; a power shaft operable by said pistons; and a valve in said valve chamber having two separated parallel compartments therein driven by said shaft and adapted in its reciprocation to alternately permit the flow of combustible mixture to pass through one compartment from the bottom of one cylinder to the explosion chamber thereof and then permit the flow of combustible mixture to pass through the other compartment from the bottom of the other cylinder to its explosion chamber.

14. In an internal combustion engine, a pair of cylinders; a valve chamber intermediate said cylinders and having communicating with each cylinder a set of ports near the top and bottom thereof and an intermediate set adapted to admit a fresh supply of combustible mixture; a piston in each cylinder adapted to close the intermediate ports when in the lower part of said cylinders; a power shaft operable by said pistons; and a valve in said valve chamber having two separated parallel compartments therein driven by said shaft and adapted in its reciprocation to alternately permit the flow of combustible mixture to flow through one compartment from the bottom of one cylinder to the explosion chamber thereof and then permit the flow of combustible mixture to flow through the other compartment from the bottom of the other cylinder to its explosion chamber, said valve having annular peripheral depressions on opposite sides of the upper ports leading from said compartments.

15. In an internal combustion engine, a pair of cylinders; a piston in each cylinder; a power shaft driven by said pistons; and a valve with two separated parallel compartments therein reciprocated by said power shaft adapted to control the flow of combustible mixture through one compartment from the mixing chamber of one cylinder to the explosion chamber thereof and then through the other compartment from the mixing chamber of the other cylinder to its explosion chamber.

16. In an internal combustion engine, a pair of cylinders; and a reciprocating valve common to both cylinders and having separated parallel compartments extending lengthwise thereof, said valve being adapted in its movement in one direction to permit the admission from one compartment of a combustible mixture to the explosion chamber of one cylinder and in its movement in the opposite direction to permit a combustible mixture to be admitted from the other compartment to the explosion chamber of the other cylinder.

17. In an internal combustion engine, two cyinders having lateral ports at the top and bottom thereof; a piston therein; a power shaft operable by said piston; a valve chamber having three ports communicating with said cylinder at opposite ends and midway of the length thereof; and a valve in said valve chamber driven by said shaft and having separated passages extending lengthwise thereof adapted to control the flow of combustible mixture through the upper and lower ports of said cylinders.

18. In an internal combustion engine, two cylinders having lateral ports at the top and bottom thereof; a piston therein; a power shaft operable by said piston; a valve chamber having three ports communicating with said cylinder at opposite ends and midway of the length thereof; and a hollow valve in said valve chamber driven by said shaft and having a central partition extending lengthwise thereof dividing said valve into two passages adapted to control the flow of combustible mixture through the upper and lower ports of said cylinders.

19. In an internal combustion engine, two cylinders having lateral ports at the top and bottom thereof: a valve chamber having communication with said cylinder; ports near the top and bottom thereof and an intermediate port adapted to admit a fresh supply of combustible mixture to said cylinder; a piston in said cylinder adapted to close the intermediate port when in the lower part of said cylinder; a power shaft operable by said piston; and a valve in said valve chamber driven by said shaft and having two separated passages therein with ports at opposite ends thereof, adapted in the reciprocation of said valve to register with said upper and lower ports to said cylinder.

20. In an internal combustion engine, a cylinder; a valve chamber having communication with said cylinder; ports near the top and bottom thereof and an intermediate port adapted to admit a fresh supply of combustible mixture to said cylinder; a piston in said cylinder adapted to close the intermediate port when in the lower part of said cylinder; a power shaft operable by said piston; and a hollow valve in said valve chamber driven by said shaft and provided with ports at opposite ends thereof adapted in the reciprocation of said valve to permit the flow of combustible mixture through a compartment from the bottom of said cylinder to the explosion chamber thereof, said valve having annular open peripheral depressions on opposite sides of its upper port adapted, during the reciprocation of said valve, to communicate with the port from said chamber to the explosion chamber of said cylinder when the explosion occurs.

21. In an internal combustion engine, a cylinder, a valve chamber having communication with said cylinder; ports near the top and bottom thereof and an intermediate port adapted to admit a fresh supply of combustible mixture to said cylinder; a piston in said cylinder adapted to close the intermediate port when in the lower part of the cylinder; a power shaft operable by said piston; and a valve in said valve chamber driven by said shaft and adapted in its reciprocation to permit the flow of combustible mixture from the bottom of said cylinder to the explosion chamber thereof, said valve having annular open peripheral depressions in the upper end thereof on opposite sides of its upper port adapted, during the reciprocation of said valve, to communicate with the port from said chamber to the explosion chamber of said cylinder when the explosion occurs.

22. In an internal combustion engine, a power shaft; two closed cylinders to receive an explosive gas and having lateral ports at the top and bottom thereof; a valvular piston adapted to reciprocate therein and divide the cylinder into a mixing chamber and an explosion chamber and control the admission of combustible mixture to the mixing chamber; a valve casing exteriorly connected with a gas supply; a hollow valve in said casing having a partition extending lengthwise thereof and forming two compartments provided at the upper and lower ends with a plurality of ports; operating mechanism to control said valve and shift the respective ports whereby upon the downward movement of the piston the waste gases in the explosion chamber may be exhausted and coincident therewith the fresh gas mixture may be mechanically forced for vaporization from the mixing chamber through the compartments of the valve to inlet ports of the explosion chambers; and means for igniting the gas charge in said explosion chamber.

23. In an internal combustion engine, a power shaft; a pair of co-operating closed cylinders; valvular pistons therefor which divide the cylinders to create in each a mixing chamber and an explosion chamber, said pistons being adapted to open the feed ports for inflow of gas to the mixing chambers upon completion of the up or compression stroke and to release the exhaust gases from the explosion chambers on the down or mixing stroke; a valve chamber connecting with a gas supply common to said cylinders; a hollow valve having a partition extending lengthwise thereof forming two compartments equipped with a plurality of ports interconnecting the said mixing and explosion chamber of the same cylinder the upper ports of said valve being oppositely disposed and the lower ports being substantially opposite; co-operating mechanism to actuate the valve and move said ports in unison to permit the gas to pass through the compartments of the valve first from the mixing chamber of one cylinder to the explosion chamber of the same cylinder and then from the mixing chamber of the other cylinder to its explosion chamber; and means for igniting the gas charge in the explosion chambers.

24. In an internal combustion engine, having two closed cylinders with pistons therein operatively connected to a power shaft and upper and lower lateral ports, a single valve for both cylinders provided with separated passages therein for the combustible mixture, each passage having ports at the opposite ends thereof adapted in the reciprocation of said valve to register with said lateral ports, the upper ports being closed when the lower ports thereof are in communication with the lower ports leading to the mixing chambers of said cylinders; and means for reciprocating said valve.

25. In an internal combustion engine having two closed cylinders with pistons therein operatively connected to a power shaft and upper and lower lateral ports, a single valve for both cylinders provided with separated passages therein for the combustible mixture, each passage having ports at the opposite ends thereof adapted in the reciprocation of said valve to register with said lateral ports, the lower ports being closed when the upper ports thereof are in communication with the lower ports leading to the explosion chambers of said cylinders; and means for reciprocating said valve.

26. In an internal combustion engine having two closed cylinders with pistons therein operatively connected to a power shaft and having upper and lower lateral ports, a single valve for both cylinders provided with separated passages therein for the combustible mixture, each passage having ports at the opposite ends thereof adapted in the reciprocation of said valve to register with said lateral ports, the upper ports being closed when the lower ports thereof are in communication with the lower ports leading to the mixing chambers of said cylinders, and the lower ports being closed when the upper ports are in communication with the upper ports leading to the explosion chambers of said cylinders.

Signed by me at 746 Old South Bldg., Boston, Mass., this 11th day of August, 1926.

GEORGE A. LOUD.